(12) United States Patent
Huo et al.

(10) Patent No.: US 7,035,915 B1
(45) Date of Patent: Apr. 25, 2006

(54) METHOD AND APPARATUS FOR IP ADDRESS ASSIGNMENT

(75) Inventors: Chaoying Huo, Redwood City, CA (US); Chao-Li Tarng, Palo Alto, CA (US); Vikas Butaney, Los Altos, CA (US); Geng Chen, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 801 days.

(21) Appl. No.: 09/947,595

(22) Filed: Sep. 5, 2001

(51) Int. Cl.
*G06F 15/16* (2006.01)

(52) U.S. Cl. .................. 709/219; 709/221; 709/223; 709/224; 370/254; 370/258; 370/401

(58) Field of Classification Search .............. 709/220, 709/225, 238, 245, 249, 219, 221, 223–224; 370/235, 389, 392, 401–402, 466, 474, 254, 370/258, 440
See application file for complete search history.

(56) References Cited

U.S. PATENT DOCUMENTS

| | | | | |
|---|---|---|---|---|
| 5,854,901 A | * | 12/1998 | Cole et al. | 709/245 |
| 5,872,524 A | * | 2/1999 | Iida | 340/825.52 |
| 6,012,088 A | * | 1/2000 | Li et al. | 709/219 |
| 6,115,545 A | * | 9/2000 | Mellquist | 709/220 |
| 6,249,813 B1 | * | 6/2001 | Campion et al. | 709/222 |
| 6,249,820 B1 | * | 6/2001 | Dobbins et al. | 709/238 |
| 6,301,667 B1 | * | 10/2001 | Digiacomo et al. | 713/201 |
| 6,434,627 B1 | * | 8/2002 | Millet et al. | 709/245 |

* cited by examiner

*Primary Examiner*—Ario Etienne
*Assistant Examiner*—LaShonda Jacobs
(74) *Attorney, Agent, or Firm*—Sierra Patent Group, Ltd.

(57) ABSTRACT

A method and apparatus for assigning an IP address, in a modular network system, to at least one client premise equipment device coupled by a communications link to a router, wherein the last octet of said IP address may be one of at least three different values.

9 Claims, 5 Drawing Sheets

METHOD AND APPARATUS FOR IP ADDRESS ASSIGNMENT

BACKGROUND OF INVENTION

1. Field of Invention

The present invention relates to the assigning of IP addresses to internal components of a modular network system.

2. The Background Art

The widespread use and acceptance of the Internet has generated much excitement, particularly among Competitive Local Exchange Carriers ("CLECs"), among others, who see advantages in networking their voice and data communications. A CLEC is a term coined for the deregulated, competitive telecommunications environment, envisioned by the Telecommunications Act of 1996. CLECs compete on a selective basis for local exchange service, as well as long distance, Internet access, and entertainment. They typically lease local loops from the incumbent Local Exchange Carriers ("LEC") at wholesale rates and then resell to end users at a discounted price. CLECs often have customer premise equipment (CPE) on site. CPEs include, but are not limited to, devices such as CSU/DSUs, modems, Integrated Access Devices (IADs) and ISDN terminal adapters, required to provide an electromagnetic termination for wide-are network circuits before connecting to the router or access server. CPEs were historically provided by the telephone company, but are now typically provided by the customer (CLEC).

CPEs are often comprised of a manufacturer's proprietary system. Thus in order to connect, set up and maintain CPEs on a computer network, a computer network specialist trained and certified in the manufacturer's proprietary system was needed. Due to the nature and importance of keeping the computer network online and working properly, the computer network specialist was often a permanent employee of the business entity installing and maintaining the CPEs for the CLEC.

However many businesses simply do not desire a system so complex that a it requires having a computer network specialist on staff full time. Hence there is a need to be able to automatically configure CPEs with a minimum of human interaction. One aspect of such an automatic configuration is the assigning of IP addresses automatically to the CPEs after the CPEs power up. An IP address is usually a 32-bit address assigned to hosts using TCP/IP. An IP address belongs to one of five classes (A, B, C, D, or E) and is written as 4 octets separated by periods (dotted decimal format). Each address consists of a network number, an optional subnetwork number, and a host number. The network and subnetwork numbers together are used for routing, while the host number is used to address an individual host within the network or subnetwork. A subnet mask is used to extract network and subnetwork information from the IP address.

Referring to FIG. 1 will aid in understanding a known method of assigning an IP address to a CPE. A device A 100 is shown with a serial connector 110. A device B 120 is also shown with a serial connector 130. Device A 100 may be a router. Device B may be a CPE. Upon powering up the system, device B 120, may use an algorithm known as a Serial Line Address Resolution Protocol (SLARP) to assign itself an IP address. The SLARP protocol 140 is shown installed in device B. One example of the algorithm the SLARP protocol uses for assigning IP addresses is shown in FIG. 2. Referring to FIG. 2, device B powers up at act 210. Device B requests A's IP address at act 220. The algorithm determines whether the last octet in A's IP address is a one (1) at query 230. If it is a one (1), the algorithm adds one (1) to the last octet of A's IP address and assigns that IP address to device B at act 240. The algorithm ends at act 280. If the algorithm determines that the last octet of A's IP address is not one (1), then the algorithm determines whether the last octet is two (2) 250. If the last octet is two (2), then the algorithm subtracts 1 from the last octet, and assigns that IP address to device B at act 260. The algorithm ends after that act 280. If the last octet of A's IP address is neither a one (1) or a two (2), then the algorithm does not assign an IP address to device B shown at act 270.

As can be seen, the algorithm described in FIG. 2 can only work with an IP address where the last octet is either a one (1) or a two (2). For example, if the IP address for device A is 132.222.19.1, then the IP address assigned to device B is 132.222.19.2 pursuant to the algorithm shown on FIG. 2. If the IP address for device A is 132.222.19.2, then the IP address assigned to device B is 132.222.19.1. If the last octet of A's IP address is anything other than one (1) or two (2), then the algorithm cannot assign an IP address to B.

Thus, there is a need to be able to automatically configure CPEs. Part of that automatic configuration includes assigning IP addresses to the CPEs, however, assigning an IP address restricted by the last octet to either one (1) or two (2) is very limiting. Thus there is also a need to be able to automatically assign IP addresses to CPEs with a range in the last octet greater than one (1) or two (2).

SUMMARY OF THE INVENTION

The present invention is directed towards a method and apparatus for assigning an IP address, in a modular network system, to at least one client premise equipment device coupled by a communications link to a router wherein the last octet of said IP address may be one of at least three different values.

BRIEF DESCRIPTION OF THE DRAWINGS

The present invention is described in greater detail by referencing the accompanying drawings.

DETAILED DESCRIPTION

Those of ordinary skill in the art will realize that the following description of the present invention is illustrative only and not in any way limiting. Other embodiments of the invention will readily suggest themselves to such skilled persons.

Figure 1:
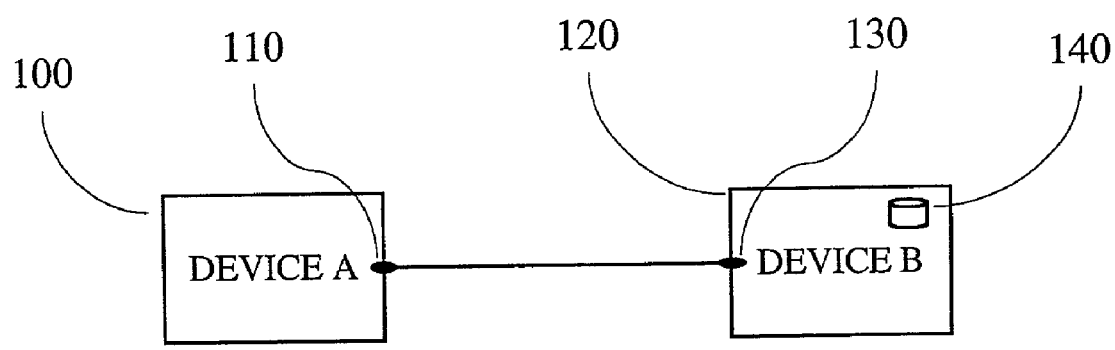
FIG. 1 is a schematic of a prior art system.
Figure 2:
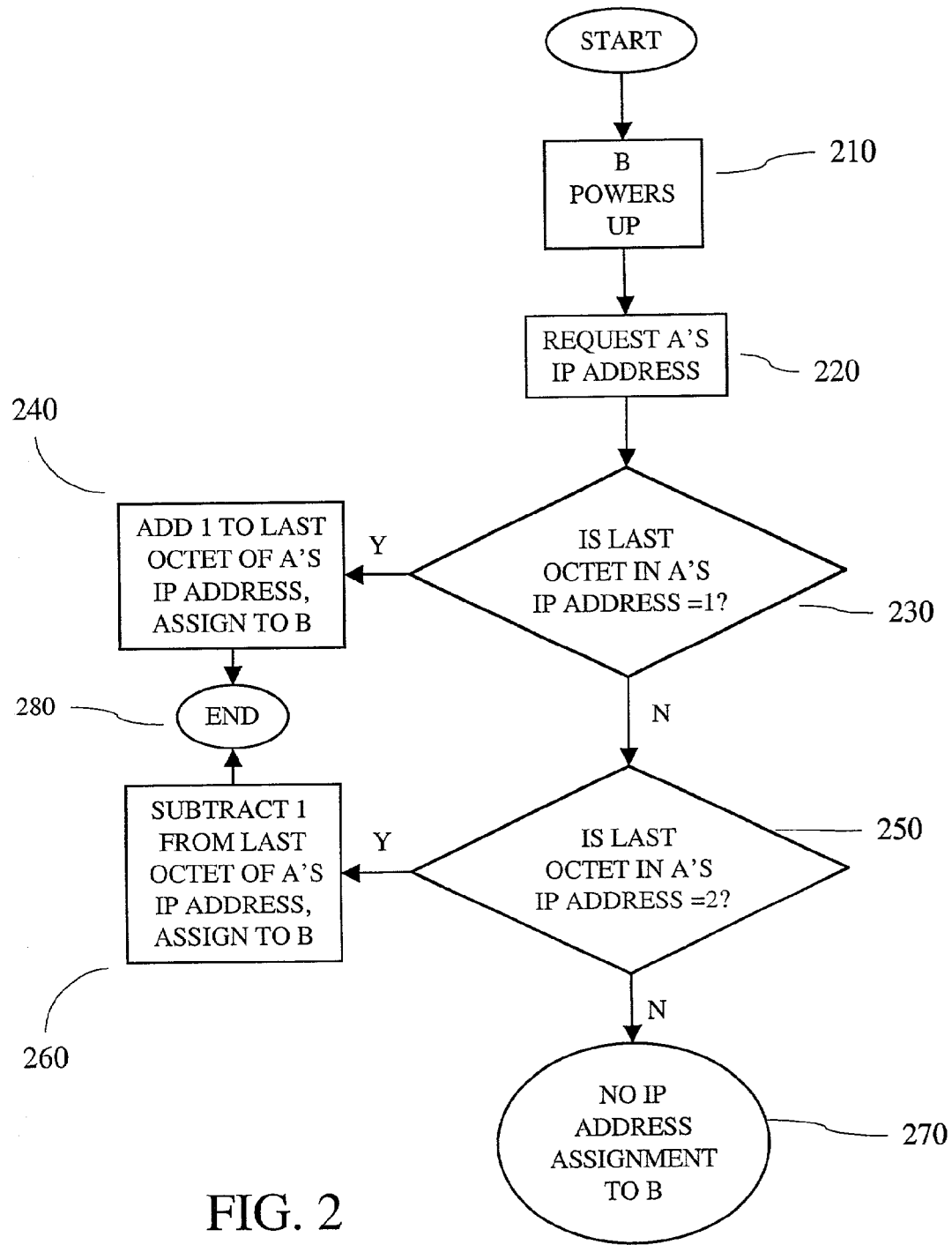
FIG. 2 is a flowchart of a prior art method.

In the prior art, a known method of automatically assigning an IP address to a CPE was by using the SLARP protocol. However, a draw-back to using only the SLARP protocol was that if device A (referring to FIG. 1) had an IP address in which the last octet was neither a one (1) or a two (2), the SLARP protocol would not be able to assign an IP address to device B (referring to FIG. 1). Further, SLARP would only assign an IP address with the last octet being either a one (1) or a two (2).

The present disclosed system will automatically assign an IP address to a CPE that is coupled to a device which has IP address with a last octet of one (1), two (2) and at least one other octet value.

Figure 3A:
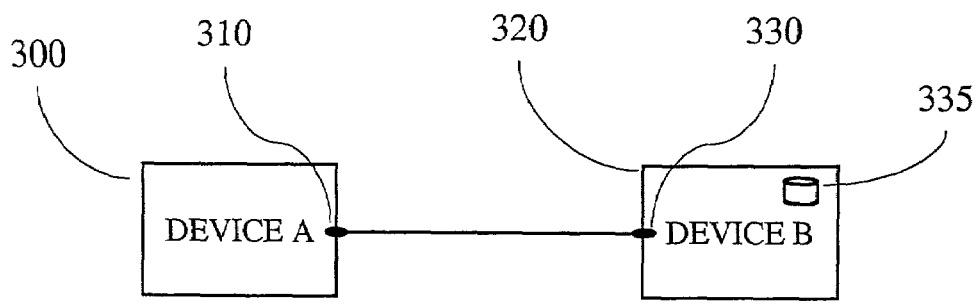
FIG. 3a is a schematic of one embodiment of the disclosed system.

Referring to FIG. 3a, a disclosed modular system is shown. Device A 300 may be a router. Device B 320 may be a CPE. Device A 300 may have a serial connector 310. Device B 320, may also have its own serial connector 330. Device B is shown with a disclosed method for automatically assigning IP address to device B as 335. In this application the term "simplex IP address" refers to an IP address in which the last octet of the IP address is one (1). Likewise, the term "duplex IP address" shall refer to an IP address in which the last octet of the IP address is two (2). Device A and device B may be coupled by a communications link via the following non-limiting list of protocols: SLARP, ATM INARP, PPP/IPCP and Frame Relay protocols over Serial, T1 and DSL connections. The communications link may be any link suitable for transmitting IP Protocol information.

Figure 3B:
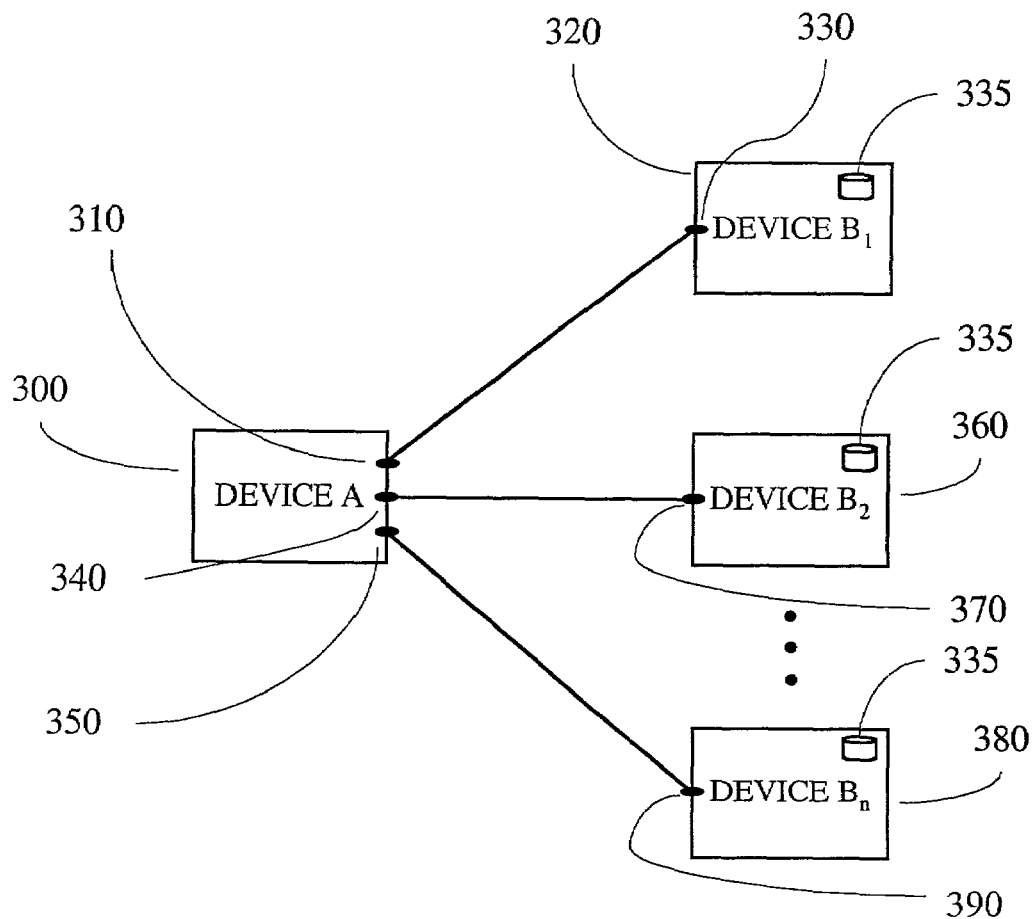
FIG. 3b is a schematic of another embodiment of the disclosed system.

Referring to FIG. 3b, the modular system of 1a is shown with devices $B_1$ through $B_n$ 320, 360 and 380 shown coupled to device A. When coupling more than one device to device A, each serial connector of device A 310, 340 and 350 may have its own IP address. Each serial connector of device A 310, 340 and 350 are coupled to the respective serial connectors of devices $B_1$ through $B_n$ 330, 370 and 390. If the last octet for the IP addresses for serial connectors 310, 340 and 350 are anything other than one (1) or two (2), then the known SLARP algorithm will not be able to assign an IP address to devices $B_1$ through $B_n$ 320, 360 and 380. The disclosed method is shown installed in devices $B_1$ through $B_n$ as 335.

Figure 4:
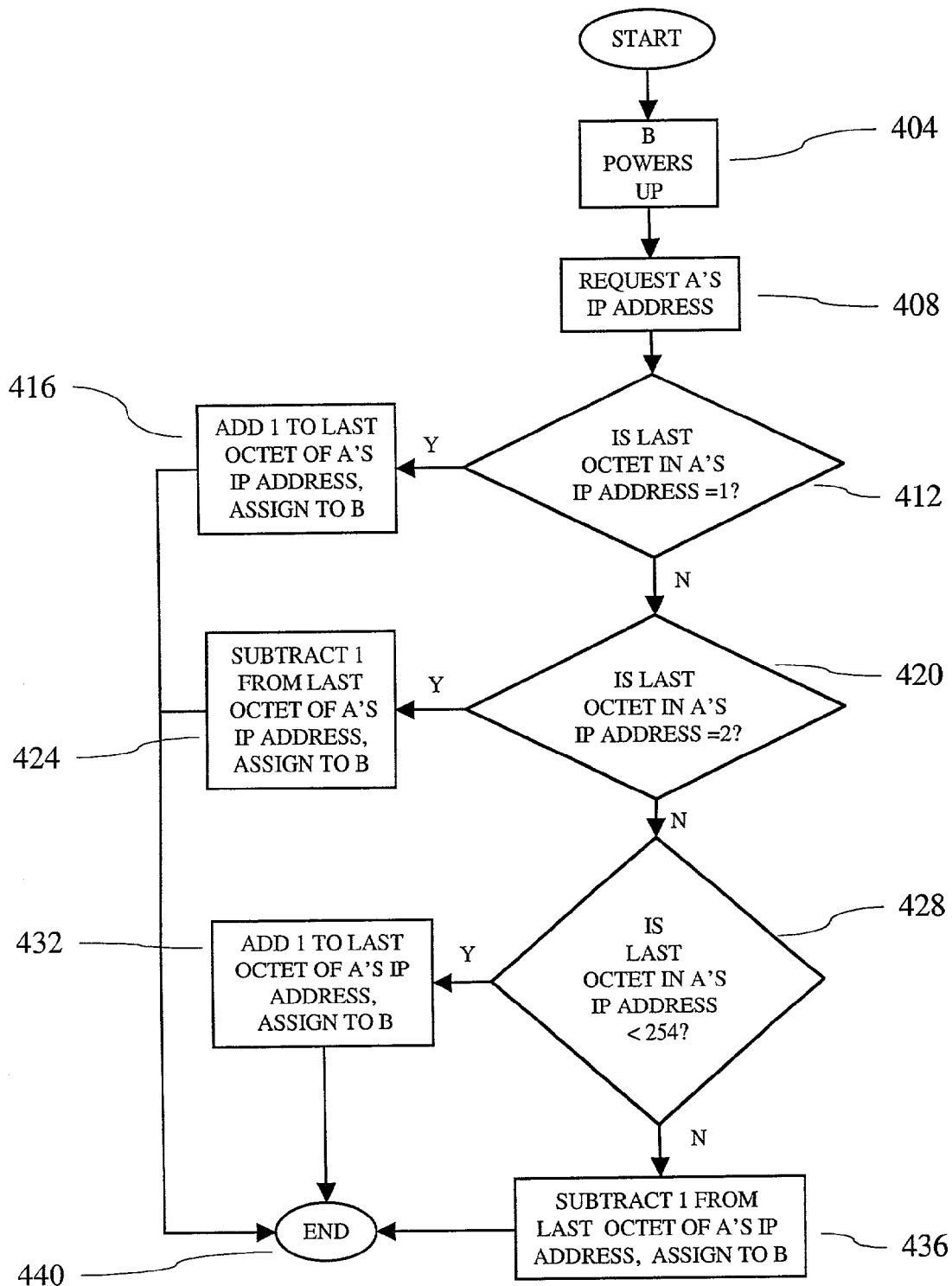
FIG. 4 is a flowchart of one embodiment of the disclosed method.

FIG. 4 shows an embodiment of the disclosed method. This embodiment allows for assigning of IP addresses with a last octet ranging from 1 through 254, inclusive. Referring to FIG. 4, device B powers up at act 404. Device B requests A's IP address at act 408. The algorithm determines whether the last octet in A's IP address is a one (1) at query 412. If it is a one (1), the algorithm adds one (1) to the last octet of A's IP address and assigns that IP address to device B at act 416. The algorithm ends at act 440. If the algorithm determines that the last octet of A's IP address is not one (1), then the algorithm determines whether the last octet is two (2) at query 420. If the last octet is two (2), then the algorithm subtracts 1 from the last octet, and assigns that IP address to device B at act 424. The algorithm ends after that at act 440. If the last octet of A's IP address is neither a one (1) or a two (2), then the algorithm proceeds to determine whether the last octet in A's IP address is less than 254 at query 428. If the last octet is less than 254, the algorithm adds 1 to the last octet of A's IP address and assigns that IP address to device B at act 432. This IP address may be referred to as an "added IP address". If the last octet of A's IP address is greater than or equal to 254, the algorithm subtracts 1 from A's IP address and assigns that IP address to device B at act 436. This IP address may be referred to as a "subtracted IP address".

In one embodiment of the disclosed system, the disclosed algorithm may be stored on each CPE device.

Referring back to FIG. 3a, if the IP address of device A is 21.244.119.254, then the disclosed algorithm would assign an IP address of 21.244.119.253.

Similarly, the disclosed system will work in a modular system shown in FIG. 3b. For instance, assuming that serial connector 310 has an IP address of 235.17.198.2, serial connector 340 has an IP address of 235.17.198.234, and serial connector 350 has an IP address of 235.17.198.99, then, pursuant to the disclosed system, the algorithm will assign the following IP addresses: $B_1$ will have an IP address of 235.17.198.1, $B_2$ will have an IP address of 235.17.198.233, and $B_n$ will have an IP address of 235.17.198.100.

Figure 5:
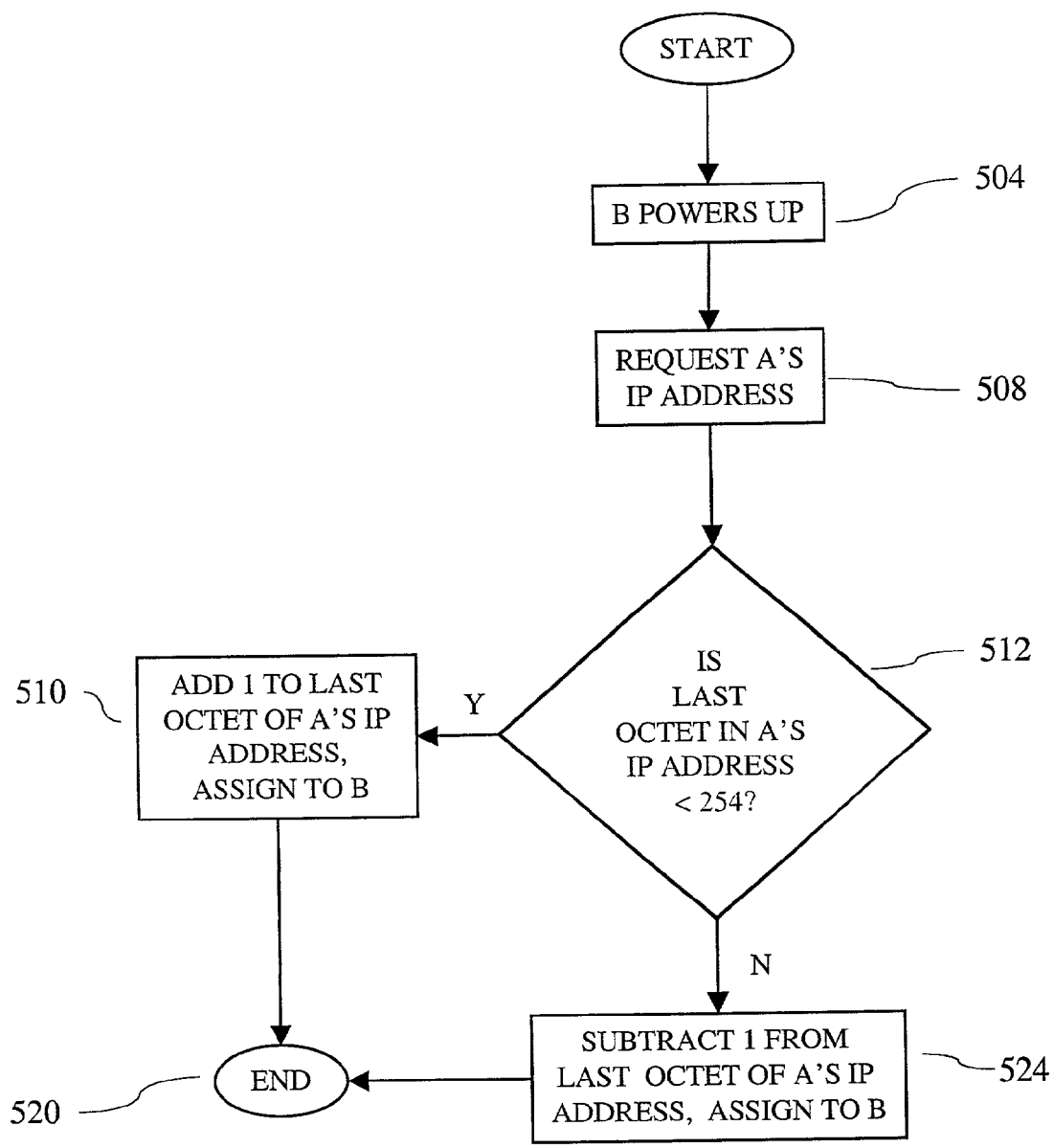
FIG. 5 is a flowchart of another embodiment of the disclosed method.

FIG. 5, shows another embodiment of the disclosed system. Device B powers up at act 504. The algorithm requests device A's IP address at act 508. The algorithm determines whether the last octet in A's IP address is less than 254 at query 512. If the last octet is less than 254, then at act 510, the algorithm adds 1 to the last octet of A's IP address and assigns that address to device B. After act 510, the algorithm ends at act 520. If the last octet of A's IP address is greater than or equal to 254, then the algorithm subtracts 1 from the last octet of A's IP address and assigns that IP address to device B at act 524. The algorithm then ends at act 520.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

The invention claimed is:

1. A method for automatically assigning an IP address to at least one client premise equipment ("CPE") coupled by a communications link to a router, wherein the last octet of said IP address may be one of at least three different values, comprising:
   requesting a router IP address from said router;
   receiving the requested IP address from said router;
   determining a value represented by the last octet of said router IP address;
   if said value is equal to one, then generating a duplex IP address by adding one to said last octet of said router IP address and assigning said duplex IP address to said at least one CPE;
   if said value is equal to two, then generating a simplex IP address by subtracting one from said last octet of said router IP address and assigning said simplex IP address to said at least one CPE;
   if said value is greater than two but is less than 254, then generating an added IP address by adding one to said last octet of said router IP address, assigning said added IP address to said at least one CPE; and
   if said value is greater than 253, then generating a subtracted IP address by subtracting one from said last octet of said router IP address and assigning said subtracted IP address to said at least one CPE.

2. The method of claim 1, wherein said communications link is a serial connection.

3. The method of claim 1, wherein said communications link is a T1 connection.

4. The method of claim 1, wherein said communications link is a DSL connection.

5. A computer, containing instructions that execute to automatically assign an IP address to at least one client premise equipment ("CPE") coupled by a communications link to a router, wherein the last octet of said IP address may be one of at least three different values, by:
   requesting a router IP address from said router;
   receiving the requested IP address from said router;

determining a value represented by the last octet of said router IP address;

if said value is equal to one, then generating a duplex IP address by adding one to said last octet of said router IP address and assigning said duplex IP address to said at least one CPE;

if said value is equal to two, then generating a simplex IP address by subtracting one from said last octet of said router IP address and assigning said simplex IP address to said at least one CPE;

if said value is greater than two but is less than 254, then generating an added IP address by adding one to said last octet of said router IP address, assigning said added IP address to said at least one CPE; and if said value is greater than 253, then generating a subtracted IP address by subtracting one from said last octet of said router IP address and assigning said subtracted IP address to said at least one CPE.

6. The computer of claim 5, wherein said communications link is a serial connection.

7. The computer of claim 5, wherein said communications link is a T1 connection.

8. The computer of claim 5, wherein said communications link is a DSL connection.

9. A computer-readable medium containing instructions which, when executed by a computer, automatically assign an IP address to at least one client premise equipment ("CPE") coupled by a communications link to a router, wherein the last octet of said IP address may be one of at least three different values, by:

requesting a router IP address from said router;

receiving the requested IP address from said router;

determining a value represented by the last octet of said router IP address;

if said value is equal to one, then generating a duplex IP address by adding one to said last octet of said router IP address and assigning said duplex IP address to said at least one CPE;

if said value is equal to two, then generating a simplex IP address by subtracting one from said last octet of said router IP address and assigning said simplex IP address to said at least one CPE;

if said value is greater than two but is less than 254, then generating an added IP address by adding one to said last octet of said router IP address, assigning said added IP address to said at least one CPE; and if said value is greater than 253, then generating a subtracted IP address by subtracting one from said last octet of said router IP address and assigning said subtracted IP address to said at least one CPE.

* * * * *